United States Patent Office 3,143,902
Patented Aug. 11, 1964

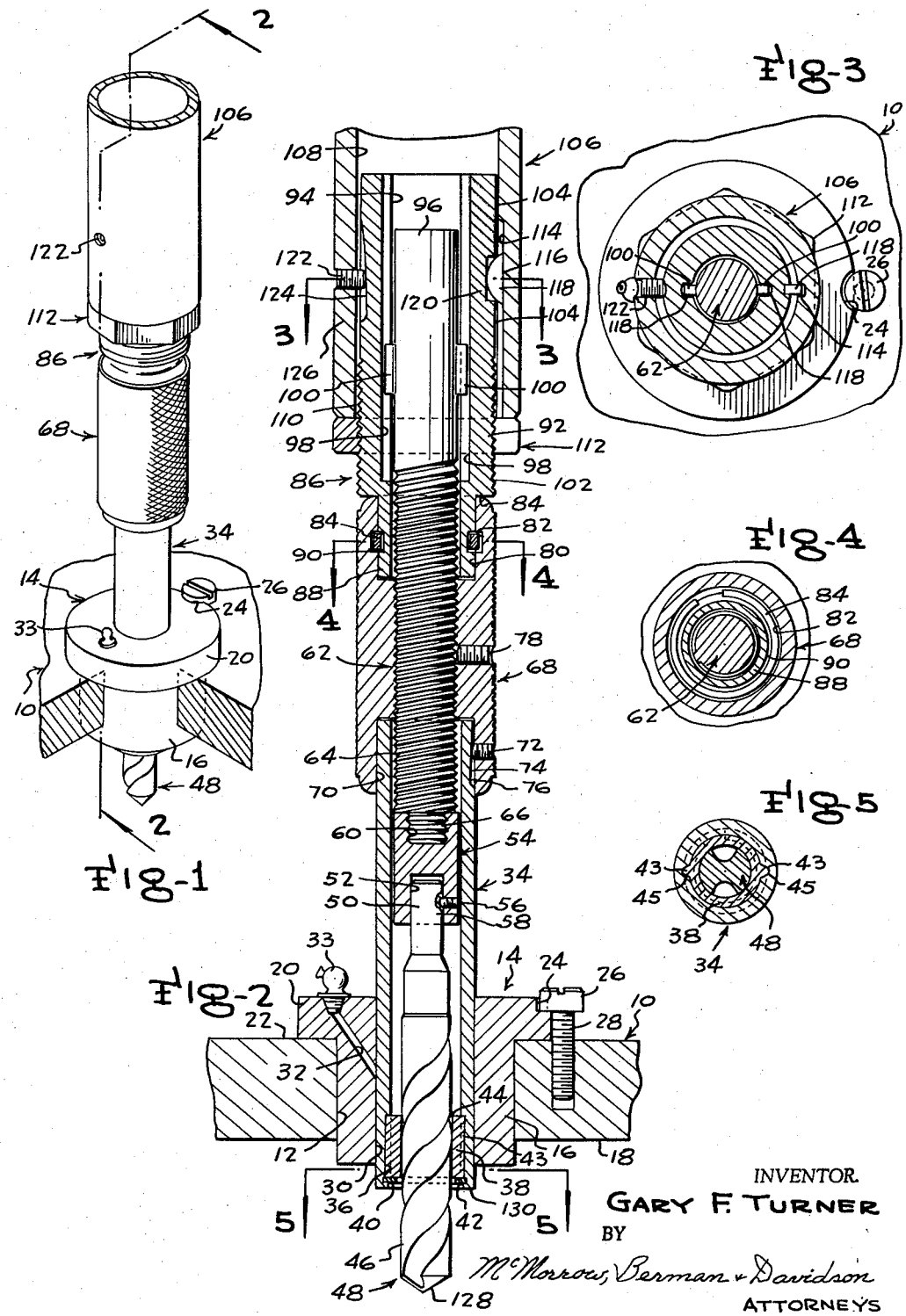

3,143,902
DRILLING ASSEMBLY
Gary F. Turner, 8067 Sharidan Road, Kenosha, Wis.
Filed Mar. 1, 1963, Ser. No. 262,152
12 Claims. (Cl. 77—55)

This invention relates to rotary cutting tools, and more particularly to a novel machine drilling assembly of the type utilizing a bushing for spotting and retaining the drill bit relative to the work.

The primary object of the invention is the provision of a more efficient and practical assembly of the kind indicated above, which enables substantially reducing production costs, by substantially reducing wear of and the consequent need for frequent replacement of worn bushings, and by enabling usage of more of the lengths of drill bits to compensate for wear thereof.

Another object of the invention is the provision in an assembly of the character indicated above, of novel and more efficient and accurate means for manually adjusting the drill bit, toward and away from the work, which does not appreciably weaken the rigidity and structural strength of the assembly.

A further object of the invention is the provision, in an assembly of the character indicated above, of a shield which surrounds the drill bit and is in supportive relation thereto, which shield extends rotatably through a smooth bore of a bushing fixed on the machine, which is adapted to be lubricated to reduce any incidental wear and prolong the life of the bushing and the need for its replacement far beyond that otherwise required.

Other important objects and advantageous features of the invention will be apparent from the following description and the accompanying drawings, wherein, for purposes of illustration only, a specific form of the invention is set forth in detail.

In the drawings:

FIGURE 1 is a fragmentary perspective view, showing an assembly of the present invention associated with a machine of having means for driving its drill bit;

FIGURE 2 is an enlarged vertical transverse section taken on the line 2—2 of FIGURE 1; and FIGURES 3, 4 and 5 are horizontal sections taken on the lines 3—3, 4—4, and 5—5, respectively, of FIGURE 2.

Referring in detail to the drawings, wherein like numerals designate like parts throughout the several views, there is shown a supportive member 10, of a power-operated machine (not shown), which is formed with a circular plain cylindrical opening 12, in which a conventional type of bushing (not shown), is conformably engaged, and, which, in accordance with the present invention, is replaced by a bushing 14.

The bushing 14 has a cylindrical body 16, which fits and extends through the opening 12 and extends beyond the far side 18 of the member 10, and has a lateral annular flange 20, which bears against the near side 22 of the member 10. The flange 20 has a notch 24, in its edge opening to its near side, in which is engaged the enlarged head 26 of a locking stud 28, threaded into the member 10, whereby rotation of or withdrawal of the bushing 14, is precluded. The bushing 14 has a smooth axial bore 30, which extends therethrough, and to which leads an angled lubrication passage 32, which opens to the near side of the bushing, where a lubricating fitting 33 is secured therein.

A uniformly cylindrical tubular shield 34, substantially longer than the bushing 14, has a close rotation and sliding fit in the bushing bore 30. The far end of the shield 34 is counterbored, as indicated at 36, to receive a secondary bushing 38, which is held removably in place, as by means of a snap ring 40, engaged in an annular groove 42, in the wall of the counterbore. Lands 43 on the bushing 38 engage in grooves 45 in the counterbore, to preclude rotation of the bushing therein. The secondary bushing 38 has a length of only a small fraction of the length of the shield 34, and has an axial bore 44, extending therethrough which is smaller in diameter than the bore of the shield, and corresponds to the diameter of the cutting portion 46 of a drill bit 48. The drill bit 48 has a sliding and supportive engagement through the second bushing bore 44, but does not turn therein, so that frequent replacement, due to wear, of the secondary bushing 38 is not needed, and the only wear upon the bushing 14, incidental to rotation of the drill bit 48, is the relatively small lubricated areas of contact between the shield 34 and the bore 30 of the bushing 14.

The drill bit 48 has a reduced diameter shank 50, on its near end, which is closely engaged in an axial polygonal socket 52, in the far end of a relatively short cylindrical holder 54. A radial locking screw 56 is threaded through the holder 54, into the socket 52, into a recess 58, in the ends of the shank, for holding the shank 50 against endwise and rotary movement relative to the holder. The holder 54 is free to rotate in the bore of the shield 34 and has a threaded axial socket 60, in its near end.

An elongated adjusting shaft 62 has a threaded far end portion 64, which turns freely in the near end of the shield 34, and terminates in an axial reduced diameter stud 66, which is threaded into the holder socket 60.

An elongated, externally knurled adjusting nut 68 is threaded on the threaded portion 64 of the adjusting shaft 64, and has a smooth socket 70, in the far end, which receives the adjacent end of the shield 34, in which this end of the shield is locked, by means of a radial locking screw 72, threaded through the sidewall of this socket and engaged with the longitudinally angled bottom 74 of a longitudinal slot 76, in the sidewall of the shield. The adjusting nut 68 is locked to the adjusting shaft 62 by means of a radial set screw 78, threaded through the nut against the threaded portion 64 of the adjusting screw. The near end of the adjusting nut 68 is formed with an axial smooth socket 80, having an internal annular locking groove 82, in its sidewall, in which is adapted to seat a resilient split ring 84, which, as shown in FIGURE 2, is narrower in width than the longitudinal width of the groove 82, so as to provide for movement relative to, and seating of the near end of the nut 68, against a shoulder 84, on the far end of an adapter 86.

The adapter 86 is tubular and of substantially the same outside diameter as the adjusting nut 68, and has a reduced diameter extension 88, on its far end, which engages rotatably and slidably in the socket 80, in the adjacent end of the nut 68, and has an internal annular groove 90, in which the split ring 84 is carried. The adapter 86 is assembled to the adjusting nut 68 by inserting the extension 88 endwise into the nut socket 80, with the ring 84 compresed, until the ring snaps out into the nut groove 82.

The main part 92 of the adapter 86 has an axial bore 94 extending therethrough, which receives the smooth cylindrical near end portion 96, of the adjusting shaft 62, and which is formed with diametrically opposed longitudinal keyways 98, which receive relatively short lugs 100, on the near end portion 96, to provide for non-rotational endwise movement, of the adjusting shaft relative to the adapter.

The adapter 86 has an externally threaded far end portion 102, and an externally smooth near end portion 104, which extends into the axial bore of a tubular spindle 106, which is suitably operatively connected to a drill head (not shown) on the associated machine, for driving the drill bit 48.

The bore 108 of the spindle 106 extends therethrough and is smooth. A short flat adjusting nut 112 is threaded on the adapter 86 and bears against the adjacent end of the spindle 106.

Means providing for endwise adjustment of the adapter 86, relative to the spindle 106, without relative rotation thereof, comprises an internal longitudinal groove 114 in the sidewall of the spindle 106, in which is slidably engaged the straight edge 116, of a semicircular key 118, whose arcuate side is seated in a short external groove 120 in the smooth near end portion 104 of the adapter 86. Rotation of the nut 112, in opposite directions, moves the adapter 86 in and out of the spindle, and such an adjustment is adapted to be locked, by means of a radial set screw 122, threaded through the sidewall of the spindle and engaged with the angled bottom 124 of an external longitudinal groove 126 in the sidewall of the adapter 86.

In operation, the depth of cut of the drill bit 48, into the work, is determined by the adjusted length of the tip 128 of the bit extended beyond the far end 130 of the shield 34, and this can be initially determined by adjusting the adapter 86, relative to the spindle 106, in the manner explained hereinabove.

When, for any reason, including especially wear of the tip of the drill bit 48 and resharpening thereof, it is desired to extend the drill bit farther out of the shield 34, the adjusting nut set screw 78 is backed out, so as to free the adjusting nut 68 to be manually rotated, on the adjusting shaft 62, and relative to the adapter 86, so as to move the adjusting shaft endwise, and hence extend the drill bit farther out of the shield 34, to the desired extent, whereat the set screw 78 is tightened so as to lock the adjusting nut 68 to the adjusting shaft, and hold the adjustment.

It is to be noted that the above described assembly is readily adaptable to use cutters other than twist drill bits, such as core drill bits, reamers, and the like.

Although there has been shown and described a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A drilling assembly comprising a support having near and far sides and formed with an opening, a fixed bushing secured in the opening and having a smooth axial bore extending therethrough, an elongated open-ended tubular shield slidably and rotatably journalled through the bore of the bushing and extending beyond the near and far sides of the bushing and the support, said shield having a fixed tubular bushing fixed in its bore adjacent to the far end of the shield, said tubular bushing having an axial bore smaller in diameter than that of the shield and sized to snugly and slidably pass a cutting bit, a cutting bit extending through the bore of the tubular bushing and extending beyond the far end thereof, and into the bore of the shield, and means for rotating the shield along with the bit relative to the fixed bushing.

2. A drilling assembly according to claim 1, wherein said rotating means comprises first means for initially adjusting the bit to extend beyond the far end of the shield for determining the initial depth of cut of the bit, and second means for further adjusting the bit to extend farther beyond the far end of the shield and for retracting the bit.

3. A drilling assembly according to claim 1, wherein said rotating means comprises first means for initially adjusting the bit to extend beyond the far end of the shield for determining the initial depth of cut of the bit, and second means for further adjusting the bit to extend farther beyond the far end of the shield and for retracting the bit, said first means being non-rotatable relative to the bit and movable endwise relative to the bit.

4. A drilling assembly according to claim 1, wherein said rotating means comprises first means for initially adjusting the bit to extend beyond the far end of the shield for determining the initial depth of cut of the bit, and second means for further adjusting the bit to extend farther beyond the far end of the shield and for retracting the bit, said first means being non-rotatable relative to the bit and movable endwise relative to the bit, said second means being rotatable relative to the bit and the shield and movable endwise relative to the shield and the bit, said second means having a first member stationary relative to said first means and to the shield.

5. A drilling assembly according to claim 1, wherein said rotating means comprises first means for initially adjusting the bit to extend beyond the far end of the shield for determining the initial depth of cut of the bit, and second means for further adjusting the bit to extend farther beyond the far end of the shield and for retracting the bit, said first means being non-rotatable relative to the bit and movable endwise relative to the bit, said second means being rotatable relative to the bit and the shield and movable endwise relative to the shield and the bit, said second means having a first member stationary relative to said first means and to the shield, and a second threaded member fixed to the bit on which said first member is threaded.

6. A drilling assembly comprising a support, a fixed bushing extending through and fixed to the support, the fixed bushing having near and far ends and a smooth bore extending therethrough, an open-ended tubular shield slidably and rotatably journalled through the bore of the fixed bushing and extending beyond the near and far ends of the bushing, and shield having a tubular bushing fixed therein adjacent to its far end, the tubular bushing having an axial bore extending therethrough, a cutting bit extending slidably and non-rotatably through the bore of the tubular bushing and reaching beyond the far end of the shield and into the shield, and means for rotating the shield and the bit together relative to the fixed bushing.

7. A drilling assembly according to claim 6, wherein the fixed bushing has an inclined lubricant passage leading from its near end to its bore for lubricating the contact of the shield with this bore, and a lubrication fitting secured in the near end of the passage.

8. A drilling assembly according to claim 6, wherein said rotating means comprises a spindle adapted to be connected to a drill head, an adjusting shaft non-rotatably connected to the spindle at its near end and non-rotatably connected to the shield and the bit at its far end, said shaft extending into the near end of the shield.

9. A drilling assembly according to claim 6, wherein said rotating means comprises a spindle adapted to be connected to a drill head, an adjusting shaft non-rotatably connected to the spindle at its near end and non-rotatably connected to the shield and the bit at its far end, said shaft extending into the near end of the shield, said spindle being tubular, a tubular adapter splined into the spindle for endwise movement relative to the spindle first means for locking the adapter and the spindle together in adjusted position, said adjusting shaft having a near end portion splined within and slidable relative to the adapter, a flat adjusting nut threaded on the adapter and engaged with the far end of the spindle for adjusting the adapter endwise relation to the spindle with said locking means disengaged.

10. A drilling assembly according to claim 6, wherein said rotating means comprises a spindle adapted to be connected to a drill head, an adjusting shaft non-rotatably connected to the spindle at its near end and non-rotatably connected to the shield and the bit at its far end, said shaft extending into the near end of the shield, said spindle being tubular, a tubular adapter splined into the spindle for endwise movement relative to the spindle first means for locking the adapter and the spindle together in adjusted position, said adjusting shaft having a near end portion splined within and slidable relative to the adapter, a flat adjusting nut threaded on the adapter and engaged with the far end of the spindle for adjusting the adapter endwise relation to the spindle with said locking means disengaged, said shaft having a threaded far end portion extending between the adapter and the shield, an elongated adjusting nut threaded on said threaded far end portion between and abutting the adapter and the shield, second locking means connecting the elongated adjusting nut and the shield for rotation together, said elongated adjusting nut being fixedly connected to the adapter for rotation relative thereto, said elongated adjusting nut being rotatable relative to the adjusting shaft in opposite directions for extending and retraction the bit relative to the shield and the fixed bushing, and third locking means for locking the elongated adjusting nut and the adjusting shaft together after extension or retraction of the bit.

11. A drilling assembly according to claim 6, wherein said rotating means comprises a spindle adapted to be connected to a drill head, an adjusting shaft non-rotatably connected to the spindle at its near end and non-rotatably connected to the shield and the bit at its far end, said shaft extending into the near end of the shield, said spindle being tubular, a tubular adapter splined into the spindle for endwise movement relative to the spindle first means for locking the adapter and the spindle together in adjusted position, said adjusting shaft having a near end portion splined within and slidable relative to the adapter, a flat adjusting nut threaded on the adapter and engaged with the far end of the spindle for adjusting the adapter endwise relation to the spindle with said locking means disengaged, said shaft having a threaded far end portion extending between the adapter and the shield, an elongated adjusting nut threaded on said threaded far end portion between and abutting the adapter and the shield, second locking means connecting the elongated adjusting nut and the shield for rotation together, said elongated adjusting nut being fixedly connected to the adapter for rotation relative thereto, said elongated adjusting nut being rotatable relative to the adjusting shaft in opposite directions for extending and retracting the bit relative to the shield and the fixed bushing, and third locking means for locking the elongated adjusting nut and the adjusting shaft together after extension or retraction of the bit, said adapter having a reduced diameter extension on its far end, said elongated adjusting nut having sockets in its ends severally receiving said extension and the near end of the shield, and fourth locking means on the elongated adjusting nut engaged with the near end of the shield within the related socket.

12. A drilling assembly according to claim 6, wherein said rotating means comprises a spindle adapted to be connected to a drill head, an adjusting shaft non-rotatably connected to the spindle at its near end and non-rotatably connected to the shield and the bit at its far end, said shaft extending into the near end of the shield, said spindle being tubular, a tubular adapter splined into the spindle for endwise movement relative to the spindle first means for locking the adapter and the spindle together in adjusted position, said adjusting shaft having a near end portion splined within and slidable relative to the adapter, a flat adjusting nut threaded on the adapter and engaged with the far end of the spindle for adjusting the adapter endwise relation to the spindle with said locking means disengaged, said adjusting shaft having a reduced diameter threaded stud on its far end, a bit holder having a threaded socket in its near end receiving said stud, said holder having a socket in its far end receiving the adjacent end of the bit, and fifth locking means on the holder engaging the bit within the related socket.

No references cited